May 31, 1955    I. P. RODMAN ET AL    2,709,796
AUTOMATIC TARGET TRAINING
Filed March 30, 1945    3 Sheets-Sheet 3
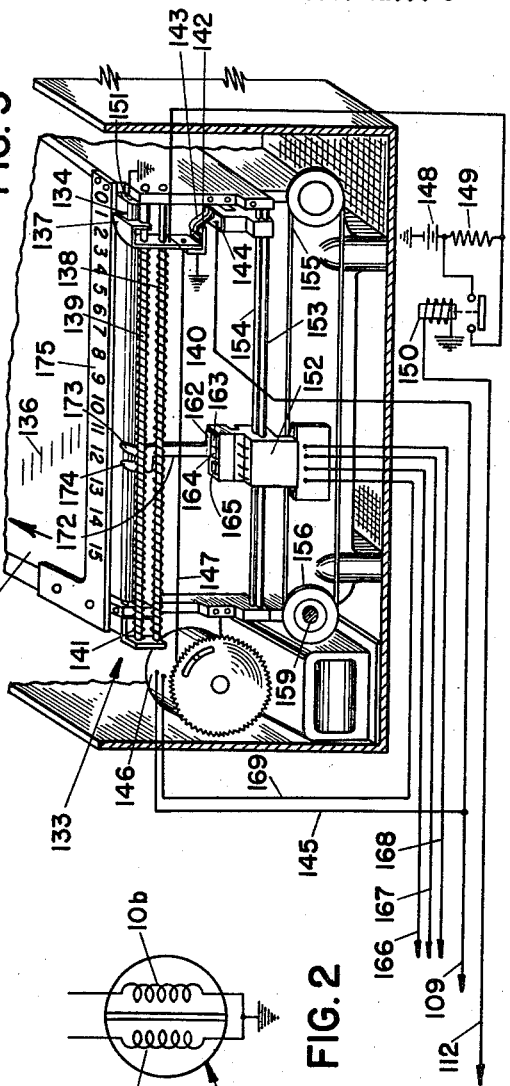
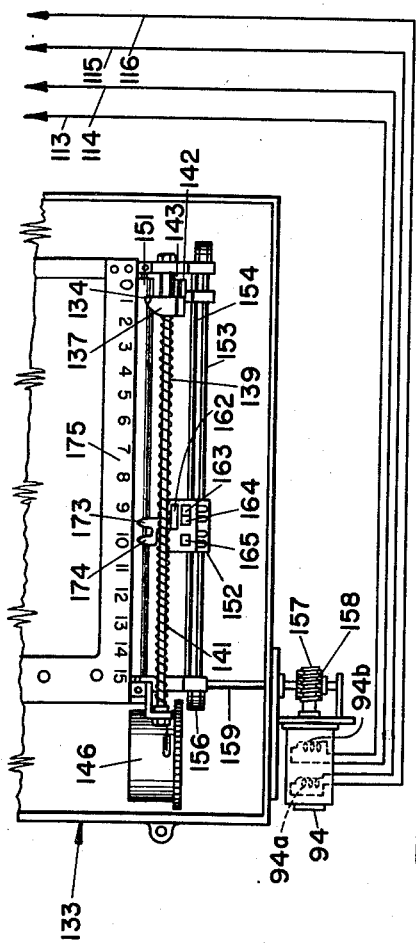
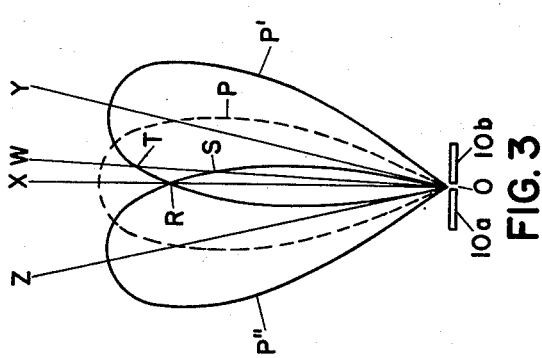
ALFRED W. NOLLE
LEON G. S. WOOD
ISAAC P. RODMAN
ALLEN A. CHERNOSKY
Inventors
By Ralph L Chappell
Attorney

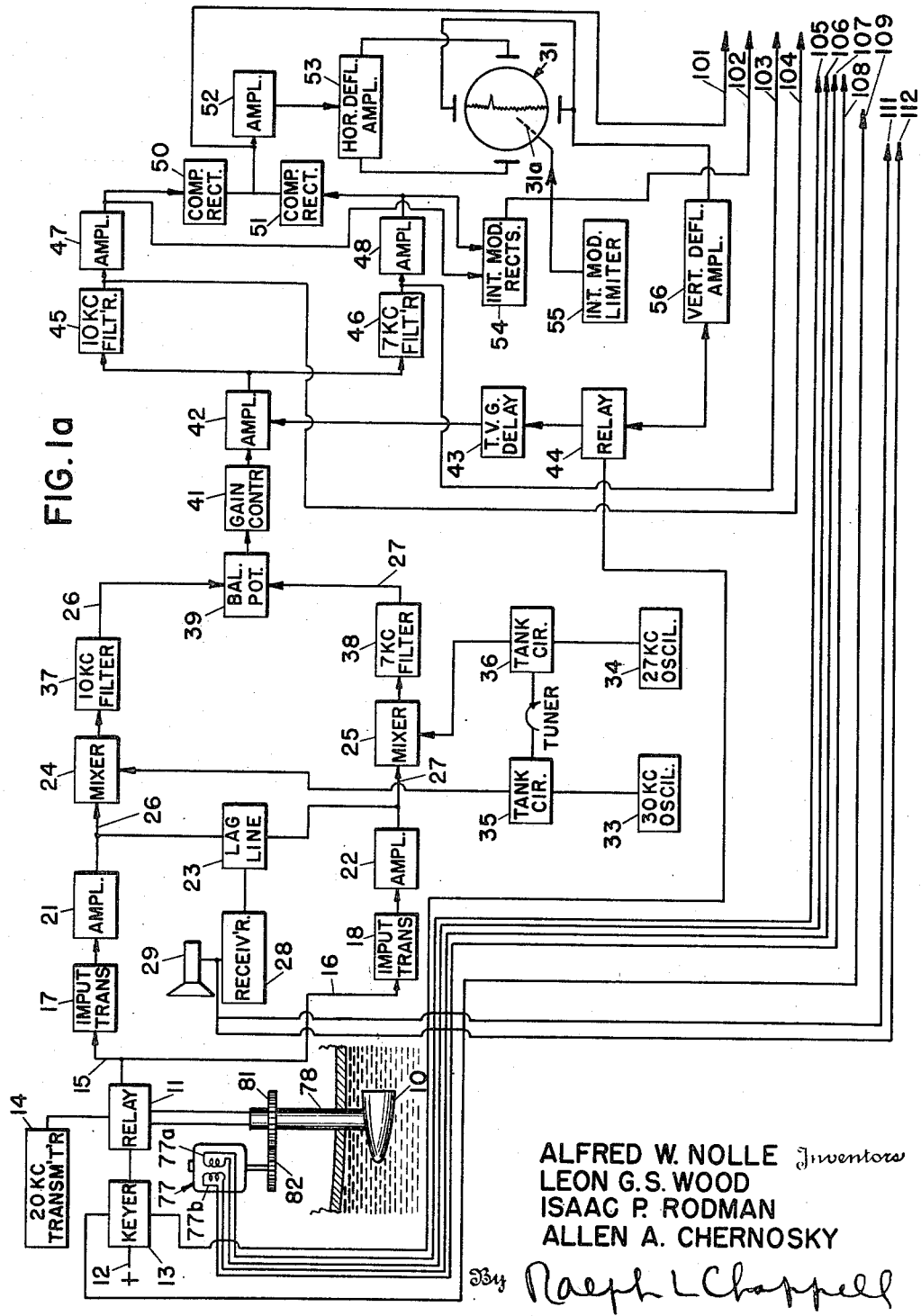

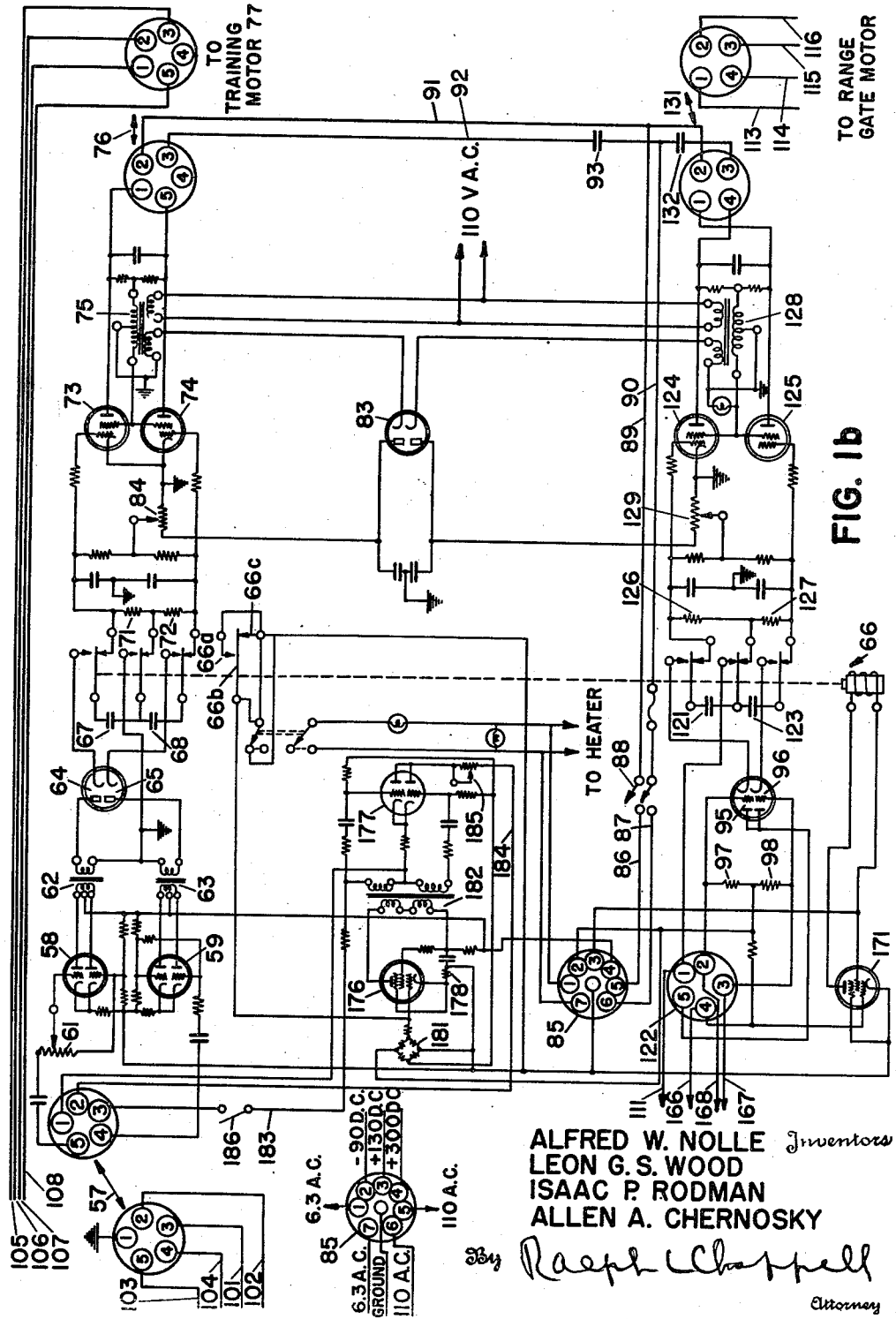

United States Patent Office 2,709,796
Patented May 31, 1955

2,709,796

AUTOMATIC TARGET TRAINING

Isaac P. Rodman, Alfred Wilson Nolle, and Allen A. Chernosky, Cambridge, and Leon G. S. Wood, Quincy, Mass., assignors to the United States of America as represented by the Secretary of the Navy Application March 30, 1945, Serial No. 585,768

12 Claims. (Cl. 340—3)

This invention relates to echo-ranging devices employing either compressional wave or radiant energy and has for its primary object to provide an automatic means to train a projector of such a device in such a manner that once contact with a target has been established, it will be maintained automatically.

Another object of the invention is to provide an electronically controlled means to follow an echo which can be set by the operator to work on any desired portion of the received wave train so that a single echo can be followed to the exclusion of all other signals.

Another object of the invention is to provide means to indicate to the operator which portion of the received wave train is being utilized to train the projector.

Other objects and advantages of the invention will become apparent from the following description and from the accompanying drawings which illustrate a preferred embodiment of the invention.

The present invention is particularly adapted to and has been perfected in conjunction with echo ranging equipment which gives a right-left indication of the bearing deviation of a target such as the underwater target bearing deviation indicator described in application Serial No. 546,842 filed July 27, 1944, by Frederick V. Hunt, et al. for Apparatus for Determining the Direction of Underwater Targets, now Patent No. 2,666,192 issued January 12, 1954.

Broadly the invention includes means to utilize the output of such an indicator during a pre-selected time or range interval to drive a training motor in a direction to cause the projector to follow the target. Optionally the device may include a recorder and/or an oscilloscope with suitable indications applied thereto to indicate the gated part of the range.

In the drawings which illustrate an application of the invention to the underwater sound target detection apparatus described in the aforesaid application;

Fig. 1a contains a block diagram of the principal circuit components of the aforesaid application which has been repeated here in order to better illustrate the invention in this application;

Fig. 1b is a continuation of the circuits shown in Fig. 1a and which shows in circuit diagram the novel control components of this invention;

Fig. 2 is a view showing the manner in which the elements of the sound projector are divided;

Fig. 3 is a polar diagram of the two overlapped directivity patterns produced by the arrangement shown in Fig. 1a;

Fig. 4 is a partial top plan of a conventional range recorder as modified in accordance with the requirements of a feature of this invention; and Fig. 5 is a partial perspective view of this modified recorder.

In order to furnish suitable background for a thorough understanding of this invention, it is considered expedient to include at this point a general description of the manner in which the system shown by the block diagram in Fig. 1a functions. In Fig. 1a and Fig. 2, the sound projector is shown at 10. The active elements of the projector, which may be either of the piezo-electric or magnetostrictive type are of conventional construction. As clearly shown in Fig. 2, the electrical connections from the elements comprising the left half 10a and those comprising the right half 10b are brought out separately.

A relay 11, the winding of which is energized intermittently and momentarily from a power source 12 through keyer 13, functions when energized to momentarily connect the output at supersonic frequency from transmitter oscillator 14 to the projector halves 10a and 10b simultaneously. The electrical energy imparted to the elements of the projector, which is a pulse of very short duration, causes a pulse of compressional wave energy to be projected through the water.

The dimensions of the transmitting face of projector 10 relative to the output frequency of transmitter 14 are such that the pulse is projected normal to this face along an axis OX (see Fig. 3), and its transmitting pattern has a major lobe such as pattern P, with its maximum along axis OX.

When relay 11 is deenergized, the projected pulse is terminated and the relay contacts then connect the projector halves 10a and 10b to separate output circuits 15 and 16.

Should the projected pulse strike an underwater target and be reflected, the pulse echo will return to the face of projector 10 and mechanically excite the projector elements thereby generating electromotive forces therein. The voltage output from the elements in projector half 10a feed into output circuit 15 and the output from the elements of projector half 10b into circuit 16.

The output voltages in circuits 15 and 16, which should be equal in amplitude or nearly so, feed into the primary windings of input transformers 17 and 18, respectively, which latter are similar and tuned to the frequency of the output voltages.

The voltages appearing across the secondary windings of transformers 17 and 18, which are of nearly equal magnitude but which are in phase only for signals from the perpendicular to the radiating face of projector 10, are impressed on the grids of isolating amplifiers 21 and 22, respectively. These amplifiers make it possible to work with projectors of widely varying impedance without the necessity of careful matching. These may, however, be dispensed with if the projector's impedance is known and the remainder of the system properly designed.

Connected across the output circuits from amplifiers 21 and 22 is a phase shifting network 23, shown in the drawing as a lag line, the function of which is to delay the voltage output from one half of projector 10 relative to that from the other half at the grid of mixer tubes 24 and 25. Lag line 23 may consist of one or more sections of constant K low pass filter, properly terminated, and designed to be operated at frequencies well below the cut-off frequency.

It will now be seen that the two projector halves 10a and 10b are connected in parallel through tuning transformers 17, 18 and amplifiers 21, 22 to the mixers 24 and 25, respectively, with lag line 23 connected across the inputs to the grid circuits of the two mixers. Therefore, a channel 26 at mixer 24 receives unshifted signal from projector half 10a and also receives a lagging signal from projector half 10b via lag line 23. The resultant signal into mixer 24 corresponds to a directional receiving pattern P' (in Fig. 3) the axis of the principal lobe of which is shifted from the perpendicular OX to axis OY.

Similarly the resultant input signal in channel 27 at mixer 25 corresponds to directional pattern P", the axis of which is shifted to the other side of the perpendicular OX to axis OZ.

As is apparent in Fig. 3, the two mixers 24, 25 get equal signals for inputs along axis OX, the intensity of such signals being equal to the vector OR. But with an input from another direction such as along axis OW, the intensity of the signal to mixer 24 (pattern P') corresponds to the vector OT and the intensity of the signal to mixer 25 (pattern P'') corresponds to the vector OS. Accordingly, the input to mixers 24, 25 will differ in intensity for input signals received along an axis like OW at one side of the perpendicular axis OX.

The output from the midpoint of lag line 23 is drawn alike from both projector halves 10a and 10b and therefore corresponds to directional pattern P in Fig. 3 with its axis OX perpendicular to the radiating face of projector 10. Accordingly, an output from the midpoint of lag line 23 may be connected to a receiver 28 which feeds loudspeaker 29. This receiver is of conventional design and therefore illustrated only in block diagram.

In order to compare the intensities in the outputs from the projector 10 in the two channels 26 and 27, a cathode ray oscilloscope 31 is utilized. Because of the fact that the working range of the oscilloscope is relatively small and the intensity level of the outputs in channels 26 and 27 varies greatly with target range and reverberation level, it is desirable to employ some sort of automatic volume control in the output amplifier system. An automatic volume control of the outputs operating as a function of time is preferable, this being known as time varied gain. Thus for spurious target pulse echoes from nearby objects such as the bottom, ship's hull, etc. corresponding to very short elapsed times after the transmission of a pulse, which echoes are at a comparatively high intensity level and are commonly referred to as reverberation, the gain will be low. The gain is allowed to rise, however, at a predetermined rate so that a greater gain will be available for the weaker, more distant pulse echoes returning from the more distant true targets such as enemy submarines.

However, with time varied gain as an accepted requirement, employment of it successfully requires its application equally to the two output channels 26 and 27. This is accomplished by combining the outputs in the two channels in a common channel to which a time varied gain voltage is applied, thereby applying an equal amount of time varied gain to each of the outputs. The outputs in each of the channels 26 and 27 are combined into a common channel by converting the two outputs to different frequencies and then transmitting them simultaneously through a common channel amplifier.

For converting the outputs to different frequencies, a pair of oscillators 33, 34 with commonly operated tank circuits 35, 36 are provided to feed mixers 24 and 25. The two oscillators are accurately tracked over their frequency range so that with a given signal frequency, mixer 24 will produce a 10 kc. beat frequency output in channel 26 while mixer 25 will produce a 7 kc. beat frequency output in channel 27. Thus with an operating frequency of 20 kc., oscillator 33 would be tuned to 30 kc. while oscillator 34 would be tuned to 27 kc.

All other frequencies including the signal frequency, the oscillator frequencies, sum frequencies and various harmonic combinations are eliminated in the output circuits of mixers 24 and 25 by means of band pass filters 37 and 38, respectively.

The outputs from filters 37 and 38 are combined in a potentiometer 39 which acts as a balancing control and which should be adjusted to balance out any difference in gain in mixers 24, 25, and filters 37, 38 for a pulse received perpendicular to the radiating face of projector 10. This control feeds voltage to a main gain control 41. The outputs from the latter feed into a two stage common amplifier 42.

The time varied gain previously referred to is indicated at 43 and comprises essentially a condenser (not shown) which is initially charged to a high negative potential that is applied across the signal input grid of amplifier 42 simultaneously with pulse emission. This is done by relay 44 which is controlled from keyer 13. With the high negative potential thus applied, the gain of amplifier 42 is materially reduced at the time of pulse transmission. A discharge circuit for the condenser then functions to gradually discharge it which results in a corresponding gradual restoration of gain of amplifier 42 to its normal value.

From amplifier 42, the two voltage outputs at 10 kc. and 7 kc. feed into band pass filters 45 and 46, respectively, the latter filters being duplicates of filters 37 and 38. Filters 45 and 46 function to separate out the 10 kc. and 7 kc. outputs so that they may be compared in the succeeding rectifier circuit.

Following the filters 45 and 46, the outputs are put through amplifiers 47 and 48 and then passed oppositely through rectifiers 50 and 51. These rectifiers are connected in reverse polarity in such manner that when the amplifiers 47 and 48 are delivering unequal output voltages, a D. C. potential is derived of either positive or negative polarity depending upon which of the amplifiers 47, 48 is delivering the greater voltage. This D. C. potential after being put through amplifier 52 is coupled to the grid of a horizontal deflection amplifiers 53 and the output of the latter is impressed across the horizontal beam deflecting plates of oscilloscope 31.

The cathode ray beam of tube 31 is maintained at a relatively low intensity except when an echo pulse is fed through the system. The means for doing this includes a pair of intensity modulator rectifiers 54 connected to the outputs of the amplifiers 47 and 48. When an echo pulse comes through these amplifiers, the resulting outputs from the rectifiers 54 combine and the positive D. C. therefrom is applied to the brightening grid 31a of tube 31.

In order to prevent excessive brightening of the cathode ray beam spot, this same output from rectifiers 54 is applied across a limiting diode 55. Whenever the rectifier output rises above a preselected value, the diode 55 passes current and hence prevents any further rise of voltage on the grid 31a.

The vertical sweep of the beam in tube 31 is controlled by a vertical deflection amplifier 56, the output of which is connected to the vertical deflection plates of tube 31. Vertical sweep of the beam spot is synchronized with pulse transmission from projector 10 so that the beam spot will start on its vertical sweep from the bottom of the tube screen at the instant that a pulse has been emitted from projector 10. This control is effected in part through contacts on relay 44, the operation of which has already been explained.

Summarizing, operation of the system described is as follows: Let it be assumed that a pulse of compressional wave energy is emitted from projector 10, the directivity pattern of which corresponds to pattern P in Fig. 3. If the pulse intercepts a target such as a submarine and is reflected back along axis OW in Fig. 3, separate and unequal outputs at 10 kc. and 7 kc., respectively, will be obtained at the outputs of amplifiers 47 and 48. These outputs are then put through comparison rectifiers 50 and 51 and the difference between the rectifier outputs is applied to the horizontal deflecting plates of the oscilloscope 31. Simultaneously with pulse emission, the cathode ray beam in tube 31 had been started on its vertical trace. Thus when the echo pulse signal is applied to the horizontal deflecting plates of the oscilloscope, the beam spot will be jogged to the left or right of the screen's vertical axis. The direction of the jog will depend upon the bearing of the returning echo pulse relative to the projector axis OX in the illustration, since the target axis is presumed to be along axis OW, beam deflection would be to the right. It would be to the left if the target axis lay on the other side of axis OX.

In order to obtain the exact bearing of the target relative to projector 10, the operator should of course rotate the projector slightly until no deflection of the beam spot due to the echo appears on the screen. As previously explained, when this condition prevails, the intensity of the outputs in channels 26 and 27 at the inputs to mixers 24 and 25 are equal, corresponding to the vector OR in Fig. 3, and hence the pulse echo is returning to the radiating face of projector 10 along the same axis at which it was emitted, namely axis OX. Under these conditions, the true bearing of the target relative to projector 10 is therefore the bearing which is coincident with the perpendicular to the radiating face of projector 10.

In the echo ranging system which has been described, training of the projector 10 to follow the target, i. e. maintaining the beam spot at the center of the tube screen in its vertical sweep was accomplished manually. As stated in the opening paragraph of this application, one of the principal objects is to provide automatic means for training the projector in such a manner that once contact with a target has been established, it will be maintained automatically.

Reference is now made particularly to Fig. 1b for applicants' novel arrangement which provides such automatic projector training. The output from the 10 kc. and 7 kc. channels on the output sides of filters 45 and 46, respectively, is taken via conductors 104 and 103, through terminals 4 and 5 of a quick detachable plug 57, into the input grids of amplifiers 58, 59 which may be of the 6SN7 type. A balancing potentiometer 61 is provided to balance any difference in gain between the amplifiers. The outputs of the latter are connected respectively to the primaries of transformers 62 and 63. The secondaries of these transformers are connected to rectifiers 64, 65 contained within a single envelope. The cathodes of these rectifiers connect with contacts of a relay 66 which when energized functions to apply the D. C. outputs of these rectifiers to a comparision circuit which consists of two capacitors 67 and 68. These capacitors are connected in opposite polarity to a common point when relay 66 is deenergized so that a difference voltage appears across resistors 71 and 72. The comparison circuit is connected to the control grids of two normally non-conducting tubes 73, 74. These may be A. C. operated type 2050 thyratrons and are so biased that, normally, no discharge takes place therein. However, as soon as the potential of the control grid of one or the other of the thyratrons is raised above a preset threshold level (approximately 1 volt above bias), that tube whose grid is positive will conduct and permit current to flow from transformer 75 through terminals 1 and 5 of connector 76 and via conductors 107, 108 to an associated winding of a reversible training motor 77 (see Fig. 1a) which is coupled to the tubular projector support housing 78 by gears 81, 82. Bias for the thyratrons 73, 74 may be obtained from the top half of a rectifier 83 and is controlled through a potentiometer 84.

Training motor 77 may conveniently comprise a two-phase wound motor. One of its windings 77a is energized from a suitable A. C. power source which comes into terminals 5 and 6 of plug connector 85 and is fed over conductors 86, 87, switch 88, conductors 89, 90, 91, 92, terminals 2 and 3 of connector 76, and conductors 105, 106 to the motor winding 77a. It will be noted that this winding has a capacitor 93 connected in series with it. The other winding 77b is supplied with current from thyratrons 73, 74 which is fed through terminals 1 and 5 of connector 76 and thence over conductors 107 and 108.

Motor 77 is thus driven in one direction or the other depending upon which of the thyratrons 73, 74 fires, the tube controlled voltage being either in phase or 180° out of phase with the voltage of the power source. The connections to motor 77 are so made as to correct the position of projector 10 of the echo-ranging system.

For example, if a target echo pulse signal should return along axis OW, the intensity of that signal in the 10 kc. and 7 kc. channels will differ. This difference will then be indicated by corresponding differences in the outputs of the pair rectifiers 64, 65, the paired capacitors 67, 68 and comparison resistors 71, 72. One of tubes 73, 74 will then be caused to fire as its grid is driven positive and supply current to motor winding 77b of such polarity that the motor turns in the correct direction to bring the radiating face of projector 10 around until the perpendicular axis OX is coincident with the axis along which the pulse echo is returning. In a like manner, rotation of projector 10 in an opposite direction is obtained when the axis of the target pulse echo lies on the opposite side of axis OX.

Obviously if the projector is already pointed directly at the target so that the signal appearing in the 7 kc. and 10 kc. channels are substantially equal and the difference voltage across resistors 71, 72 is therefore small, neither of the thyratrons 73, 74 will fire and no training correction movement will be produced in motor 77.

In connection with the automatic train control of projector 10 just described, it has been found desirable to restrict the control exerted on motor 77 from thyratrons 73 and 74 to that interval during which a true target echo occurs in order that reverberation and other unwanted noise shall not prohibitively disturb the operation of the device. A range gate circuit and mechanism provided for this purpose will be more fully described hereinafter. This gate is driven by a range gate motor 94 after having been initially set by the operator to bracket the desired echo. Not only does the range gate determine the time of closure of relay 66 previously referred to but its associated mechanism also causes the successive operation of two rectifiers 95, 96 shown in Fig. 1b as two halves of a type 6SN7 tube with the plates and grids connected as though the tube were to be used as a pair of diode rectifiers. Normally these grids are supplied with 90 volts negative potential from a suitable source feeding through terminal 2 of connector 85 and resistors 97, 98, and the rectifiers 95, 96 are normally cut off so that no rectification can take place. However, the grids of tubes 95, 96 are successively grounded so that rectification takes place first in rectifier 95 and then tube 96. This occurs during the interval that relay 66 is energized so that capacitor 121 receives a charge proportional to the intensity of the signal delivered to receiver 28 via conductor 111, which is tapped to the audio output of the receiver, and terminal 1 of plug connector 122; capacitor 123 receives a similar charge during the second half of the gate interval.

When relay 66 is deenergized, following the gate interval, capacitors 121 and 123, acting through resistors 126, 127, are connected in opposite polarity between the grids of motor control tubes 124 and 125 which, in the present instance, are gas filled tubes, normally non-conducting, that are operated identically with tubes 73, 74 and biased from the lower half of rectifier 83 through potentiometer 129.

The range gate motor 94, shown in Fig. 4, may be of the same type as motor 77, including a pair of windings 94a and 94b. Winding 94a is energized from the same power source as winding 77a of motor 77, the connection extending from conductors 91, 92 through terminals 2 and 3 of connector 131 and over conductors 115, 116. It will be noted that winding 94a has a capacitor 132 connected in series with it. The other winding 94b is supplied with current from thyratron tubes 124, 125 which is fed through terminals 1 and 4 of connector 131 and thence over conductors 113, 114.

Thus if the difference voltage between resistors 126 and 127, associated with capacitors 121 and 123, is sufficient to exceed the threshold bias, one or the other of tubes 124, 125 will fire and cause current to flow from transformer 128 through terminals 1 and 4 of plug connector 131 and via conductors 113, 114 to winding 94b. Rotation of motor 94 is thus started in the direction determined by the firing of the thyratrons 124, 125.

The means by which the above described gating action takes place is incorporated in a range recorder 133. This recorder is of conventional construction and hence only a fragmentary portion has been illustrated in Figs. 4 and 5. It will be appreciated, however, that the same action and control can be supplied by any number of devices which move in accordance with, or are influenced by a change in the range. The present embodiment is, at the present time, to be preferred.

Referring now to Figs. 4 and 5, the range recorder 133 comprises a mechanism by which a stylus 134 is moved laterally across a chart 135 at a rate such that the stylus position is an indication of the range of the target pulse echo with respect to the observer's ship, the echo being a reflected portion of the pulse emitted when the stylus was at the zero range position. In the illustrated recorder, which is of the electro-chemical type, the stylus marks a line 136 on the chart as sound is received by the projector, the density of which is in proportion to the received acoustic level so that a true echo appears as a dark spot in a light line. The chart paper is carried on a roll and moved continuously in the direction indicated by the arrow, a new trace being started each time that a pulse is sent out. Thus once the echo ranging system has established sound contact with the target, and the recorder put in operation, there will be a separate trace established on the chart for each pulse.

In particular, it will be noted that stylus 134 is carried by a slider arm 137 having a pair of apertures through which pass rods 138, 139. These rods are anchored at their ends to the recorder frame and carry flyback springs 140, 141. One end of each spring bears against the recorder frame and the other against the arm 137.

Supported at the bottom of arm 137, but electrically insulated therefrom are a pair of resilient contact fingers 142, 143 which are grounded. When arm 137 is in the position shown which is the zero range position, it is seen that contact finger 142 is in contact with stationary contact member 144. Conductor 109 leads from contact 144 back to keyer 13 (Fig. 1a). Thus as conductor 109 becomes grounded through contact members 142 and 144, keyer 13 operates to close relay 11 momentarily to send out a short pulse of compressional wave energy. By means of a branch conductor 145 connected to conductor 109, a motor 146, started at this same time, begins to wind up a flexible cord 147, the end of which is attached to arm 137, sliding the latter on rods 138, 139 across the chart and compressing springs 140, 141.

Stylus 134 is connected with the electro-chemical chart paper 135 in a circuit which may include a battery 148, resistor 149 and relay 150. The circuit may be traced from the negative side of battery 148 which is grounded, through resistor 149, stylus 134, chart paper 135, and roll 151 to ground, the roll 151 being in contact with the underside of chart paper 135 at the point of contact with stylus 134. Thus as the stylus 134 begins to move across the chart, a small amount of current flowing from the stylus through the paper in the circuit just described causes a faint line to be traced. However when the target pulse echo returns and is put through receiver 28 and into loudspeaker 29 it is seen that the audio output from receiver 28 is also fed over conductor 112 to thereby energize relay 150. As the contacts of this relay close, resistor 149 is shunted out of the stylus-chart circuit causing an increase in current and thereby making the chart trace much darker for the duration of the echo pulse. If desired stylus 134 may be connected through a suitable gain control, directly to receiver output lead 112. In this case the density of the line marked in the recorder paper is a function of the receiver output and will appear heavy during the reverberation period and then lighter except for the interval denoting reception of a target echo. Recorder 133 is also provided with a contact block 152 which is supported by parallel rods 153, 154 and moved laterally thereon by an endless belt 155 trained over a drive pulley 156, the latter being driven when necessary, by the range gate driving motor 94. The driving connection between motor 94 and pulley 156 consists of worm 157, gear 158, and shaft 159 upon which pulley 156 is mounted.

Block 152 carries one long contact 162 and two short contacts 163, 164 arranged in a line parallel to contact 162. Contact 162 has a length corresponding to approximately 100 yards as measured on the 1500 yard range scale 175 of recorder 133. In line with contacts 163, 164 is still another contact 165 the function of which will be explained later.

Conductor 166 connects contact 162 to terminal 4 on plug connector 122 in Fig. 1b; conductor 167 connects contact 163 to terminal 3; and conductor 168 connects contact 164 to terminal 2 of this connector. Conductor 169 connects contact 165 into the control circuit for motor 146. Block 152 is so located that as arm 137 moves across the chart, grounded contact finger 143 will come into engagement with contact 162. When this occurs, a circuit connected to contact 162 will assume ground potential and similarly as contact finger 142 rides successively over contacts 163 and 164, circuits associated therewith will be grounded.

Reference now to the circuit diagram in Fig. 1b will show that contact 162, the relay control or gate interval contact, is connected to the normally biased grid of tube 171, so that when the ground is established, the tube will conduct and energize the winding of relay 66 causing the latter to pull in its contacts. As illustrated, the contacts of relay 66 are shown in the positions they occupy when this relay winding is deenergized.

Contact 163, connected via conductor 167 to terminal 3 of plug connector 122, is in circuit with the grid of rectifier 96. Similarly, contact 164 connected via conductor 168 to terminal 2 of plug connector 122, is in circuit with the grid of rectifier 95. Hence as contacts 163 and 164 are successively grounded by contact finger 142, the two rectifiers 95, 96 will conduct in succession, each for about one half of the gate interval.

When contact finger 142 comes into contact with contact member 165, the conductor 169 associated therewith also becomes grounded and serves to declutch motor 146 thereby allowing arm member 137 carrying stylus 134 to fly back to the zero range position under the restoring force which had been built up in springs 140, 141 as these were compressed by motion of arm 137 in the opposite direction. Another pulse is then transmitted, motor 146 is again energized and arm 137 is started across chart 135 to record another trace.

Block 152 is connected to belt 155 by a friction coupling which may be a double overrunning friction clutch of conventional design, not illustrated, which permits the block 152 to be slipped along belt 155 by hand to set it to the correct position when the apparatus is first put into operation. In connection with this feature, it will be seen that block 152 carries an arm 172 which terminates in a pair of indicating fingers 173, 174. These fingers are positioned adjacent the range scale 175. The distance between the pointed ends of the fingers 173, 174 is the same as the length of contact 162. Hence the operator is always informed as to the position of block 152 and the points at which the range gate is opened and closed.

It may be desirable in practice to indicate to the sound operator as well as the operator of the range recorder that portion of the received sound wave train is bracketed at any time by the range gate. To this end, the present invention provides means, which may be used or not as the installation requires, which indicates this information on the face of oscilloscope 31 associated with the echo-ranging system shown in Fig. 1a. In the circuit shown in Fig.

1b, the range gate limits are defined either as instantaneous lines across the face of the oscilloscope screen or as bright dots at the beginning and end of the gated portion. This indicating circuit includes tubes 176, 177 and is operated by contacts 66a, 66b, and 66c of relay 66; while contact 66b rests on contact 66c, tube 176 is biased only by the voltage drop across a resistor 178 which serves to prevent excessive plate current. When contact 66b moves away from contact 66c, cut-off bias is applied from the −90 volt source through a voltage divider 181, causing a rapid collapse of the plate current through the primary of a transformer 182. As soon as relay contact 66c has completed its travel to contact 66a, the grid of tube 176 is returned to ground and the flow of plate current of tube 176 through transformer 182 is resumed.

The system remains quiescent while relay 66 is energized, but when the relay is deenergized at the end of the gate interval, the collapse and the reestablishing cycle is repeated.

The current pulses in the primary of transformer 182 are differentiated in the transformer and applied in terms of voltage changes in the secondary. These secondary voltages are fed via conductor 183, terminal 3 of plug 57 and conductor 101 to the horizontal deflection amplifier 52 of the oscilloscope 31. However, unless additional brightening is supplied, the pulses cannot be seen upon the screen of the oscilloscope. To produce the necessary brightening, the voltage surges in transformer 182 are delivered to the grids of tube 177 with the result that one half or the other half of this tube draws increased current. The plates of tube 177 are connected to each other and to the brightening grid 31a of the oscilloscope 31. This circuit extends over conductor 184, terminal 2 of plug connector 57, and conductor 102 to the brightening grid 31a. Hence the bias of the tube 31 is reduced as tube 177 conducts causing the beam spot to brighten to such an extent that the range marks are clearly visible. The degree of brightening can be preset or controlled by potentiometer 185.

If the operator prefers bright dots to line range limit indications, it is only necessary to open the connection to the deflection amplifier 52 by switch 186, leaving only the brightening connections from tube 177 intact.

*Operation*

In operation, when an echo has been received, the conning officer sets the range recorder 133 in operation, observes the position of the echo trace 136 and moves the range gate arm 172 so that fingers 173, 174 bracket this trace. In so doing he has properly positioned the block 152 and its associated contacts. As the recorder operates, the stylus carriage 137 sweeps back and forth. With each forward movement, contacts 142, 143 are swept across contacts 162, 163 and 164, causing relay 66 to close as the bias is removed from tube 171 and successively removing the bias from the grids of rectifiers 95, 96 permitting a charge in proportion to the relative signal intensity in the first and second halves of the gate interval to be impressed on capacitors 121 and 123.

During the interval that relay 66 is closed, the signals in the 7 kc. and 10 kc. channels of the receiver are amplified in tubes 58 and 59, respectively, rectified in rectifiers 64 and 65, and impressed as charges on capacitors 67 and 68. When the relay 66 again opens at the end of the gate interval, the charges on the capacitors 67—68 are compared and if one charge exceeds the other by more than a predetermined value (about 1 volt), one or the other of the tubes 73 or 74 conducts and motor 77 is operated to train the projector in a direction to follow the target.

Since the comparison of the charges of capacitors 67 and 68 requires that they be connected together in opposite polarity, resistors 71 and 72 in this circuit can be used to determine the time required for the capacitors to discharge and hence the time during which motor 77 will operate.

The same holds true for the action of range gate motor 94. This motor will be driven in a direction dictated by a comparison of the intensity of the charge on capacitors 121 and 123 made after relay 66 drops open, and, roughly, the duration of its movement and thus the extent of correction applied to the range gate will depend on the length of time required for capacitors 121 and 123 to discharge through resistors 126 and 127 which perform the function corresponding to that performed by resistors 71 and 72. If the echo is such that it is received predominantly during the first half of the gate interval the motor 94 moves contact block 152 to shorten the range so as to equalize the reception in the two gate interval divisions. Similarly if the echo predominates in the last half, the motor 94 drives the parts towards the correcting position for the increased range.

It will be seen that the present invention gives the operator of the recorder greatly increased control over the conduct of an attack, for by monitoring the range gate he can be assured that the projector is trained on the target of his selection. This has the advantage of placing the attack in the hands of that member of the attack team who has the most information concerning the movement of the target and who can therefore anticipate its course. Further the echo strength increases as the range closes so that, at the end of the attack, little or no monitoring is required and the operator is free to utilize the information previously recorded to set firing times, etc.

While the invention has been described in connection with a specific type of receiver and recorder it should be understood that numerous changes in the circuits and components can be made without departing from the spirit of the invention as defined in the appended claims.

Having fully described this invention, we claim:

1. Means to train the projector of a sonic echo-ranging apparatus, comprising right and left channels responsive to received signals for indicating the deviation in the bearing of an echoing target from the projector bearing, a range recorder including range gate means to admit during a gate interval a portion of a received wave train, means to compare the signal intensity in the right and left channels during said gate interval, means to utilize said compared signals to actuate a projector driving motor to tend to correct the training of the projector, means to compare the signal intensity during successive parts of said gate interval, and means to utilize said last named compared signals to change the position of said range gate means to tend to equalize the signal intensities during said successive parts of said gate interval.

2. Apparatus in accordance with claim 1 in which the means to compare the signal intensities in said right and left channels includes capacitors connected to said channels during the gate interval and connected to each other in opposite polarity subsequently.

3. Apparatus in accordance with claim 1 in which the means to compare the signal intensities during successive parts of said gate interval includes capacitors charged only during a respective part of the gate interval, said capacitors being connected to each other in opposite polarity immediately upon conclusion of the gate interval.

4. Means to train the projector of a sonic echo-ranging apparatus, comprising right and left channels responsive to received signals for indicating the deviation in the bearing of an echoing target from the projector bearing, a range recorder for producing a record of target ranges with respect to time and including range gate means to admit during gate interval a portion of a received train which contains an echo from a target to be followed, means to compare the signal intensities in the right and left channels during said gate interval, a pair of normally non-conducting tubes connected to said comparison circuit whereby a predominance above a predetermined threshold level of a signal in one channel over the other causes current to flow in one of said tubes or the other depending on the sense of the predominance, electrically actuated drive means for the projector, and connections between said tubes and said drive means whereby the drive means operates from the current passed by said tubes in a direction tending to correct a discrepancy between target bearing and projector bearing.

5. Apparatus in accordance with claim 4 and means to compare the signal intensity during successive parts of said gate interval, and means to utilize said last named compared signals to change the position of said range gate means to tend to equalize the signal intensities during said successive parts to said gate interval to correct for a change in range of the target to be followed.

6. Apparatus in accordance with claim 4 and means to compare the signal intensity during successive halves of said gate interval including a capacitor connected to be charged only during the first half of the gate interval, a capacitor connected to be charged only during the second half of the gate interval, said capacitors being connected together in opposite polarity immediately upon conclusion of the gate interval, driving means for the range gate, and connections to actuate said driving means in one direction or the other depending on the sense of the predominance of charge in said capacitors, the direction being always such as to tend to correct the position of the range gate to equalize the signal intensity in the two halves of the gate interval.

7. Means to train the projector of a sonic-echo-ranging apparatus, comprising right and left channels responsive to received signals for indicating the deviation in the bearing of an echoing target from the projector bearing, a mechanical range recorder, a range gate operable by said mechanical recorder to admit only that portion of a received wave train which contains an echo, means to analyze the echo for right-left predominance, means to utilize the output of said analyzer to train the projector to follow a change in target bearing, separate means to analyze the echo in range, and mean to utilize the output of said second analyzer to position the range gate.

8. Apparatus in accordance with claim 7 and an oscilloscope to indicate the received wave train and means to indicate on the oscilloscope that portion of the wave train being admitted by the range gate.

9. In a sonic echo ranging system, a transducer having a directional characteristic, a sonic transmitter for periodically emitting pulses of sound energy, a receiver connected to said transducer including means for producing error signals indicative of the direction and magnitude of azimuthal deviation of said transducer from the direction to a target producing an echo, range recording means for recording the indicated range to the target following transmission of each transmitted pulse, adjustable means on said range recording means to produce a gating pulse at a time corresponding to a predetermined range, motor means mechanically connected to said transducer to correct deviations in said transducer direction and means responsive to said gating pulse to electrically connect said motor means to said error signal, whereby said transducer is directed toward a target producing an echo during said gating pulse.

10. In a sonic echo ranging system, a transmitter for periodically emitting pulses of sonic energy, a receiver for receiving echoes from targets, a transducer having a directional characteristic, a receiver for indicating echoes, a recorder connected to said transmitter and said receiver for mechanically indicating the range of a target, adjustable means on said recorder for producing a gating pulse at a recording position corresponding to a selectable range, direction control means connected to said receiver for producing a signal indicative of the direction and magnitude of error in alignment of the transducer with the target, motor means mechanically connected to said transducer, and means responsive to said gating pulse to connect said motor means to said direction control means, whereby to correct the error in alignment of the transducer.

11. In a sonic echo ranging system, a transmitter for periodically emitting pulses of sonic energy, a transducer having a directional characteristic, a receiver connected to said transducer, a recorder having a movable stylus connected to said transmitter and said receiver to indicate the range to a target, movable contact means on said stylus, adjustable contact means on said recorder movable with respect to said stylus, motor means connected to said adjustable contact means for changing its position with respect to range, and means jointly controlled by said receiver and said movable and adjustable contact means to actuate said motor means, whereby to maintain said adjustable contact means in a position corresponding to the range of a selected target.

12. In a sonic echo ranging system, a transmitter for periodically emitting pulses of sonic energy, a transducer having a directional characteristic, a receiver connected to said transducer to receive echoes from targets, a range recorder having a movable stylus connected to said transmitter and said receiver to record the range of targets, movable contact means on said stylus, adjustable contact means on said recorder cooperating with said movable contact means and adjustable to a position corresponding to a desired range, direction control means connected to said receiver for producing a signal indicative of the direction and magnitude of misalignment of said transducer with a target, first motor means connected to said transducer for correcting alignment thereof, means jointly responsive to said direction control means and said contact means to actuate said first motor means to correct misalignment of said transducer, second motor means connected to said adjustable contact means for varying the position thereof, and means jointly responsive to said contact means and said receiver to actuate said second motor means to maintain contact with a selected target.

References Cited in the file of this patent

UNITED STATES PATENTS

| | | |
|---|---|---|
| 2,166,991 | Guanella | July 25, 1939 |
| 2,329,504 | Young | Sept. 14, 1943 |
| 2,349,370 | Orner | May 23, 1944 |
| 2,455,265 | Norgaard | Nov. 30, 1948 |
| 2,459,117 | Oliver | Jan. 11, 1949 |
| 2,467,208 | Hahn | Apr. 12, 1949 |
| 2,467,368 | Batchelder | Apr. 19, 1949 |
| 2,581,211 | Sink | Jan. 1, 1952 |